Patented Jan. 24, 1950

2,495,246

UNITED STATES PATENT OFFICE 2,495,246

METHOD OF PREPARING SODIUM l-ASCORBATE

Herman Herbert Fox, Passaic, and Martha Mabel Creighton, Nutley, N. J., assignors to Hoffmann-La Roche Inc., Nutley, N. J., a corporation of New Jersey No Drawing. Application July 1, 1948, Serial No. 36,446

5 Claims. (Cl. 260—344.5)

The present invention relates to the production of crystalline sodium l-ascorbate of high purity and excellent stability.

Various methods are described in the literature for preparing sodium l-ascorbate, but generally the product obtained was not satisfactory, being usually impure and unstable. The salt was normally first obtained as a syrup, which subsequently crystallized. The crystallized product thus obtained included small amounts of alkalies and other impurities which adversely affected its stability.

It has been recently proposed to prepare sodium l-ascorbate by reacting a solution of l-ascorbic acid in methyl alcohol with sodium methylate or sodium hydroxide under anhydrous conditions. See U. S. Patent 2,434,625.

According to another procedure it is proposed to prepare sodium l-ascorbate by dissolving l-ascorbic acid in water, adding an alkali bicarbonate, followed by addition of a substantially anhydrous aliphatic alcohol, filtering and drying, the entire process taking place at a temperature not substantially above room temperature. See U. S. Patent 2,442,005.

Our investigations have revealed that even traces of alkali adhering to sodium l-ascorbate will lead inevitably to discoloration of the compound within a relatively short time. Usually the discoloration starts at several distinctly circumscribed spots in the material, even when it is stored under vacuum. The discoloration spreads slowly throughout the material, and in a period of several days to a few weeks, the whole sodium l-ascorbate has turned into a yellow mass. Solutions of sodium l-ascorbate containing traces of alkali decompose much more rapidly, so that such solutions are strongly colored within a few days, even if they are kept under an inert gas in sealed containers. When subjected to elevated temperatures, for example, 40-50° C., such solutions become discolored in a few hours. The decomposition is obviously not only a matter of oxidation, because it occurs also in the absence of oxygen, but also a consequence of a direct reaction of the alkali with the ascorbic acid molecule, probably by some interaction with the lactone group present.

We have found that the absence of alkali cannot be accomplished satisfactorily if sodium methylate, sodium hydroxide, or sodium carbonate are used for the conversion of l-ascorbic acid into sodium l-ascorbate. Even if less than the theoretical amounts of these materials are used for the formation of sodium l-ascorbate, the finished material shows poor stability. It appears that during the addition of the mentioned sodium compounds to a solution of l-ascorbic acid, even if only for fractions of a second, local alkaline conditions are created which immediately start some decomposition of the sodium l-ascorbate. As a consequence sodium l-ascorbate prepared with any of these sodium derivatives is comparatively of low stability.

The only procedure we have found which enables l-ascorbic acid to be converted into the sodium salt without danger of any transient alkaline reaction in the solution involves the addition of the sodium salt in the form of sodium bicarbonate. This avoids any possibility of having alkaline conditions in the reaction mixture. In addition to being essentially neutral, sodium bicarbonate is cheap and non-hygroscopic, enabling the weighing of calculated amounts without the difficulties inherent in the correct weighing of compounds such as sodium carbonate, sodium methylate and sodium hydroxide.

We have found that even when prepared with the precautions above mentioned regarding avoidance of alkalinity, the resulting sodium l-ascorbate is of poor stability when it is precipitated in the cold from the reaction solution by means of an organic solvent in which it is slightly soluble or insoluble. The reason for this is that sodium l-ascorbate does not form supersaturated solutions in the cold, and hence is precipitated rapidly and has no time to assume a uniform crystalline shape. As a matter of fact, precipitation of aqueous or aqueous alcoholic solutions of sodium l-ascorbate in the cold with the aforesaid solvents frequently results in the precipitation of an amorphous and oily sodium l-ascorbate which only on further standing turns solid. Even if at times precipitation with alcohols apparently yields directly a sodium l-ascorbate, microscopic examination reveals that part of the sodium l-ascorbate always consists of spherical aggregates which proves that it first separated in an amorphous shape and only subsequently solidified. It is not surprising that material of this type is not very stable. Precipitation of even only a small amount of sodium l-ascorbate in the amorphous state leads to inclusion of impurities and mother liquor which cannot be removed by washing.

A second condition which we have found necessary for the preparation of highly stable sodium l-ascorbate is that the salt be obtained directly from the reaction medium in a uniform crystalline shape, that is, no intermediate formation of any amorphous or oily material be permitted to form. We have found that sodium l-ascorbate as obtained in the reaction medium according to our process described below always separates directly in uniform crystalline shape when the reaction medium is treated with methanol while maintaining the temperature at about 55° to 70° C. Under these conditions the sodium l-ascorbate forms a supersaturated solution from which it separates only after it has assumed a uniformly crystalline shape. In this manner, inclusion of impurities is avoided since the uniform crystalline compound does not include mother liquor.

According to the present invention, a simple and highly economical method for commercial scale operation is provided for producing crystalline sodium l-ascorbate of high purity and excellent stability in practically quantitative yields. In practice, the new method for producing crystalline sodium l-ascorbate comprises dissolving l-ascorbic acid in a mixture of substantially equal parts of methanol and preferably oxygen-free water, under a preferably inert atmosphere, such as nitrogen or carbon dioxide, at a temperature of about 55–70° C., reacting the l-ascorbic acid, after it has dissolved with sodium bicarbonate while maintaining the aforesaid temperature, and then introducing hot (55–65° C.) methanol in the reaction medium while maintaining the temperature of the medium at about 55–70° C., until initiation of crystal formation. After the first crystals have formed, further crystallization proceeds rapidly, and is finally completed by cooling.

Under these conditions no immediate precipitation of sodium l-ascorbate in non-crystalline form occurs. No mother liquor is included in the crystals, and after filtration and washing, sodium l-ascorbate is obtained which on microscopic examination consists of uniformly crystallized material.

The high purity of sodium l-ascorbate prepared in this manner is evidenced by its unusual stability. It has remained entirely colorless when stored in frequently opened bottles without a protective inert atmosphere for long periods of time. Ampoule solutions in clear glass without stabilizing agents have shown no color change for even longer periods of time.

The following examples will serve to illustrate the invention:

Example 1

Five kgs. of l-ascorbic acid are dissolved in a mixture of 5 liters of oxygen-free water and 5 liters of methanol under an atmosphere of carbon dioxide while maintaining the mixture at 60–65° C. Immediately after dissolving the acid, 2.370 kgs. of pure sodium bicarbonate are added as rapidly as the violent boiling and carbon dioxide evolution will allow. The temperature is kept at 56–60° C. while agitating continuously. The reaction takes about 3–5 minutes. After all the bicarbonate has been introduced, 50 liters of hot methanol are added over a period of 18–22 minutes, while the temperature is kept at 56–64° C. Formation of crystalline sodium l-ascorbate begins after about 25 liters of methanol have been added. Agitation for fifteen more minutes at 60–64° C. results in a homogeneous crystalline product without oily or amorphous material. The reaction mixture is cooled. The salt is filtered, washed with several portions of anhydrous methanol, and dried at 35–40° C. under normal pressure. A yield of crystalline sodium l-ascorbate corresponding to 92.5–94.3% of theory is obtained.

Example 2

Two hundred gms. of crystalline l-ascorbic acid are introduced in a mixture of 200 cc. of methanol and 200 cc. of water, heated to 70° C. The mixture is stirred. In about 5 minutes the l-ascorbic acid dissolves to a clear colorless solution. As soon as the l-ascorbic acid is dissolved, 95.4 gms. of sodium bicarbonate are added to the solution at such a rate that a constant and rapid evolution of carbon dioxide takes place. This requires about five minutes. When the evolution of carbon dioxide has ceased, two liters of boiling methanol (64° C.) are added while stirring. After one liter of the methanol has been added, crystals of sodium l-ascorbate appear. The reaction medium is cooled in an ice-water bath, the crystals of sodium l-ascorbate filtered, washed with ice-cold methanol, and dried. The crystals obtained are over 99% pure. The entire process is carried out under an atmosphere of carbon dioxide.

Example 3

700 grams of l-ascorbic acid are dissolved in a mixture of 700 cc. of water and 700 cc. of methyl alcohol under an atmosphere of carbon dioxide at about 65–70° C. To the resulting solution, 333 grams of sodium bicarbonate are added in portions while stirring. When the evolution of carbon dioxide ceases, the clear reaction mixture is stirred vigorously and is slowly diluted with a total of 7 liters of methyl alcohol at such a rate that the temperature of the reaction mixture is maintained at about 65–70° C. After about half the methyl alcohol has been added, crystallization of sodium l-ascorbate starts. The mixture is then cooled to 0° C. and is held at that temperature for about two hours. The white macrocrystalline precipitate of sodium l-ascorbate is filtered and dried. The crystals appear as thick rhomboids and prisms.

We claim:

1. A process of preparing crystalline sodium l-ascorbate which comprises treating an aqueous methanolic solution of l-ascorbic acid with sodium bicarbonate to form sodium l-ascorbate, and thereafter adding methanol to said reaction mixture, the entire process being carried out at a temperature of about 55–70° C.

2. A process according to claim 1 in which the initial ascorbic acid solution is unsaturated with respect to the ascorbic acid content.

3. A process according to claim 1 in which hot methanol is added to the sodium ascorbate solution.

4. A process according to claim 1 in which the aqueous methanolic solution consists substantially of equal parts of water and methanol.

5. A process according to claim 1 which comprises the step of cooling the reaction mixture following the addition of the methanol in order to facilitate separation of the crystalline product.

HERMAN HERBERT FOX.
MARTHA MABEL CREIGHTON.

REFERENCES CITED

The following references are of record in the file of this patent:

UNITED STATES PATENTS

| Number | Name | Date |
|---|---|---|
| 2,179,978 | Elger | Nov. 14, 1939 |
| 2,434,625 | Ruskin | Jan. 13, 1948 |
| 2,442,005 | Holland | May 25, 1948 |

OTHER REFERENCES

Herbert et al., Chemical Society Journal, 1933, page 1279.